(12) United States Patent
Richmond (10) Patent No.: US 11,570,177 B2
(45) Date of Patent: Jan. 31, 2023

(54) DISTRIBUTED REMOTE NETWORK SYSTEMS FOR PROCESSING RESOURCE CENTER OPERATIONS

(71) Applicant: BANK OF AMERICA CORPORATION, Charlotte, NC (US)

(72) Inventor: Ivan Ettore Richmond, Edmonds, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 558 days.

(21) Appl. No.: 16/534,128

(22) Filed: Aug. 7, 2019

(65) Prior Publication Data

US 2021/0044592 A1    Feb. 11, 2021

(51) Int. Cl.
 *G06F 16/9035* (2019.01)
 *H04L 9/40* (2022.01)
 *G06F 9/54* (2006.01)

(52) U.S. Cl.
 CPC ............ *H04L 63/102* (2013.01); *G06F 9/542* (2013.01); *G06F 16/9035* (2019.01); *H04L 63/08* (2013.01)

(58) Field of Classification Search
 CPC ....... H04L 63/102; H04L 63/08; H04L 67/30; G06F 16/9035; G06F 9/542
 USPC ..................... 726/4; 709/203, 204
 See application file for complete search history.

(56) References Cited

U.S. PATENT DOCUMENTS

| | | | | |
|---|---|---|---|---|
| 7,698,398 B1* | 4/2010 | Lai | ......................... | G06Q 30/00 709/228 |
| 8,204,779 B1* | 6/2012 | Hughes | ............... | G06Q 10/063 705/7.29 |
| 8,230,461 B1* | 7/2012 | Ledermann | ...... | H04N 21/25891 725/46 |
| 8,346,929 B1* | 1/2013 | Lai | ......................... | H04L 67/51 709/226 |
| 8,625,769 B1* | 1/2014 | Allen | ......................... | 348/14.08 |
| 8,767,593 B1* | 7/2014 | Allen | ............................ | 370/263 |
| 8,769,304 B2* | 7/2014 | Kirsch | ............... | G06Q 20/0855 713/183 |
| 8,843,997 B1* | 9/2014 | Hare | ................... | H04L 63/0815 709/200 |
| 8,904,506 B1* | 12/2014 | Canavor | ................. | H04L 67/52 713/182 |
| 10,373,157 B1* | 8/2019 | Lynn | ...................... | G06Q 20/10 |

(Continued)

*Primary Examiner* — Thu Ha T Nguyen
(74) *Attorney, Agent, or Firm* — Moore & Van Allen PLLC; Nicholas C. Russell (57) ABSTRACT

A remote distributed system for processing resource center operations by extracting one or more interaction entity profiles from one or more resource entity systems, store the one or more interaction entity profiles in a repository in the memory of the distributed remote networks systems, identifying that at least one third party entity system is requesting permission to access at least one interaction entity profile, where in the at least one third party entity system is associated with a resource center, authenticating the at least one third party system and displaying, via a graphical user interface, the at least one interaction entity profile on the at least one third party system, wherein the at least one interaction entity profile is used by the at least one third party entity to process interactions associated with the resource entity and an interaction entity associated with the at least one interaction entity profile.

17 Claims, 5 Drawing Sheets

(56) References Cited

U.S. PATENT DOCUMENTS

| | | | |
|---|---|---|---|
| 10,616,411 B1* | 4/2020 | Chang | H04M 3/2281 |
| 10,824,996 B1* | 11/2020 | Chu | G06Q 10/1095 |
| 11,151,468 B1* | 10/2021 | Chen | G06Q 30/0202 |
| 2005/0187876 A1 | 8/2005 | Gessler | |
| 2008/0098062 A1* | 4/2008 | Balia | G06F 16/9535 |
| | | | 709/203 |
| 2009/0276257 A1* | 11/2009 | Draper | B25J 9/042 |
| | | | 705/7.28 |
| 2012/0145777 A1 | 6/2012 | Brindley et al. | |
| 2013/0073672 A1* | 3/2013 | Ayed | H04L 67/306 |
| | | | 709/217 |
| 2013/0103577 A1* | 4/2013 | Lawson | G06Q 20/405 |
| | | | 705/39 |
| 2013/0151349 A1* | 6/2013 | Patel | G06Q 20/108 |
| | | | 705/14.67 |
| 2013/0191372 A1* | 7/2013 | Lee | G06F 16/9535 |
| | | | 707/722 |
| 2013/0191904 A1* | 7/2013 | Piliouras | G06Q 30/0269 |
| | | | 726/7 |
| 2013/0198815 A1* | 8/2013 | Piliouras | G06Q 30/0269 |
| | | | 726/4 |
| 2014/0068266 A1* | 3/2014 | Cismas | H04L 63/08 |
| | | | 713/171 |
| 2015/0150107 A1* | 5/2015 | Piliouras | H04L 63/102 |
| | | | 726/7 |
| 2016/0005044 A1* | 1/2016 | Moss | G06Q 20/4016 |
| | | | 705/44 |
| 2016/0012465 A1* | 1/2016 | Sharp | G06Q 20/321 |
| | | | 705/14.17 |
| 2016/0042648 A1* | 2/2016 | Kothuri | A63F 13/92 |
| | | | 434/236 |
| 2018/0114127 A1* | 4/2018 | Cole | G06N 5/04 |
| 2018/0144153 A1* | 5/2018 | Pead | G06F 21/6245 |
| 2018/0158139 A1* | 6/2018 | Krajicek | G06Q 40/025 |
| 2018/0197129 A1* | 7/2018 | Appel | G06Q 10/06315 |
| 2019/0087760 A1* | 3/2019 | Appel | G06Q 10/0637 |
| 2019/0095916 A1* | 3/2019 | Jackson | G06Q 20/405 |
| 2019/0318423 A1* | 10/2019 | Kajicek | G06Q 20/102 |
| 2020/0111086 A1* | 4/2020 | Castinado | G06Q 20/381 |
| 2020/0112518 A1* | 4/2020 | Castinado | H04W 4/08 |
| 2020/0112519 A1* | 4/2020 | Castinado | H04W 4/08 |
| 2020/0286400 A1* | 9/2020 | Jackson | G06F 16/2379 |
| 2020/0356882 A1* | 11/2020 | Antoine | G06N 20/00 |
| 2021/0042408 A1* | 2/2021 | Van Dyke | G06F 21/552 |
| 2021/0044592 A1* | 2/2021 | Richmond | H04L 63/08 |
| 2022/0059240 A1* | 2/2022 | Schaeffer | G16B 20/20 |
| 2022/0198562 A1* | 6/2022 | Celia | G06Q 40/04 |
| 2022/0280104 A1* | 9/2022 | Golay | G16H 50/70 |
| 2022/0327430 A1* | 10/2022 | Zuberi | G06N 20/20 |
| 2022/0327625 A1* | 10/2022 | Leung | G06Q 40/06 |

\* cited by examiner

DISTRIBUTED REMOTE NETWORK SYSTEMS FOR PROCESSING RESOURCE CENTER OPERATIONS

BACKGROUND

Current systems do not have the ability to process operations associated with resource centers efficiently. As such, there exists a need for a system to process resource center operations.

BRIEF SUMMARY

Embodiments of the present invention address the above needs and/or achieve other advantages by providing apparatuses (e.g., a system, computer program product and/or other devices) and methods for processing resource center operations. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may extract one or more interaction entity profiles from one or more resource entity systems, wherein the one or more interaction entity profiles are associated with one or more interaction entities, wherein the one or more resource entity systems are associated with a resource entity, store the one or more interaction entity profiles in a repository in the memory, identify that at least one third party entity system is requesting permission to access at least one interaction entity profile, wherein the at least one third party entity system is associated with at least one third party entity that processes interactions associated with the resource entity and the one or more interaction entities, authenticate the at least one third party system and grant permission to access the at least one interaction entity profile, and display, via a graphical user interface, the at least one interaction entity profile on the at least one third party system, wherein the at least one interaction entity profile is used by the at least one third party entity to process interactions associated with the resource entity and an interaction entity associated with the at least one interaction entity profile.

In some embodiments, the invention identifies a real-time change associated with the at least one interaction entity profile, updates the at least one interaction entity profile stored in the repository, and modifies the graphical user interface in real-time to reflect the real-time change on the at least one third party system In some embodiments, the invention identifies a real-time event, wherein the real-time event is dissolution of the at least one third party entity.

In some embodiments, the invention in response to identifying the real-time event, performs one or more actions to mitigate outcomes of the real-time event, wherein the one or more actions comprise at least one of generating and transmitting one or more alerts to at least one of the one or more resource entity systems and the one or more interaction entities, blocking the permission to access the one or more interaction entity profiles and transferring the permission to access the one or more interaction entity profiles to at least one other third party entity.

In some embodiments, the invention displays a processing interface to the at least one third party entity system, wherein the processing interface is utilized by the at least one third party system to perform the interactions in real-time.

In some embodiments, the invention identifies preferences of the at least one third party and modifies the graphical user interface to display the at least one interaction entity profile based on the identified preferences.

In some embodiments, the one or more interaction entities are customers of the resource entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "resource entity" may be any financial institution that processes interactions. The term "interaction" may be transfer and/or exchange of resources between a resource entity and an interaction entity or between two interaction entities with the resource entity as a mediator. In some embodiments, the one or more interaction entities may be customers of the resource entity. In accordance with embodiments of the invention, the term "third party entity" may be a vendor of the resource entity. In some embodiments, the third party entity may be an entity that manages a resource center (e.g., cash vault).

Figure 1:
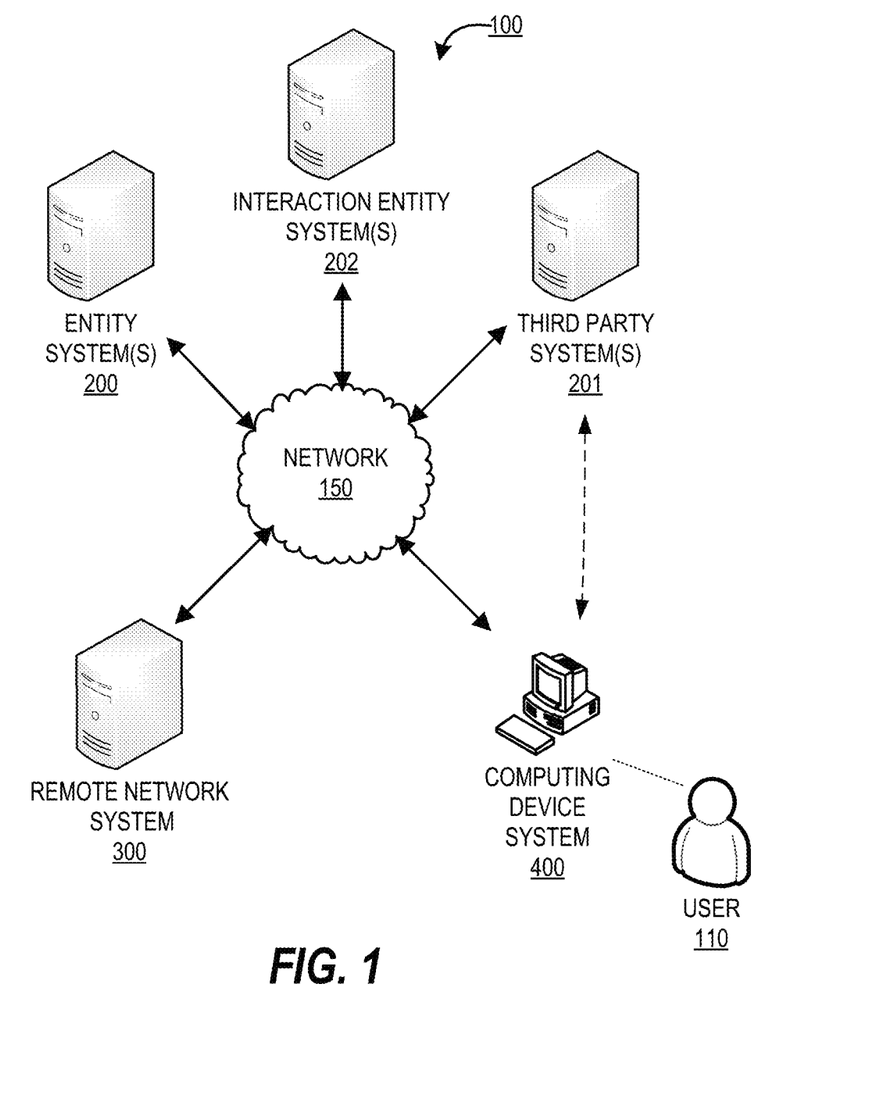
FIG. 1 provides a block diagram illustrating a system environment for processing resource center operations, in accordance with an embodiment of the invention.

FIG. 1 provides a block diagram illustrating a system environment 100 for processing resource center operations, in accordance with an embodiment of the invention. As illustrated in FIG. 1, the environment 100 includes a remote network system 300, entity system 200, a computing device system 400, one or more interaction entity systems 202, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of a third party entity associated with the one or more third party systems 201.

The entity system(s) 200 may be any system owned or otherwise controlled by a resource entity to support or perform one or more process steps described herein. In some embodiments, the resource entity is a financial institution. The one or more third party systems 201 may be any system associated with a third-party entity. In some embodiments, the third-party entity may be a vendor associated with resource entity that manages resources of the resource entity. The third party entity may be a resource center that controls and manages resources associated with the resource entity. The one or more interaction entity systems 202 are systems of one or more interaction entities. In some embodiments, the one or more interaction entities are customers of the resource entity. In some embodiments, the one or more interaction entities are large organizations that handle large amount of resources.

The remote network system 300 is a system of the present invention for performing one or more process steps described herein. In some embodiments, the remote network system 300 may be an independent system. In some embodiments, the remote network system 300 may be a part of the entity system 200.

The remote network system 300, the entity system 200, the computing device system 400, the one or more interaction entity systems 202, and/or the one or more third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the remote network system 300 is configured to communicate information or instructions with the entity system 200, the computing device system 400, the one or more interaction entity systems 202, and/or the one or more third party systems 201 across the network 150.

The computing device system 400 may be a computing device of the user 110. In general, the computing device system 400 communicates with the user 110 via a user interface of the computing device system 400, and in turn is configured to communicate information or instructions with the remote network system 300, entity system 200, the one or more interaction entity systems 202, the one or more interaction entity systems 202, and/or the one or more third party systems 201 across the network 150.

Figure 2:
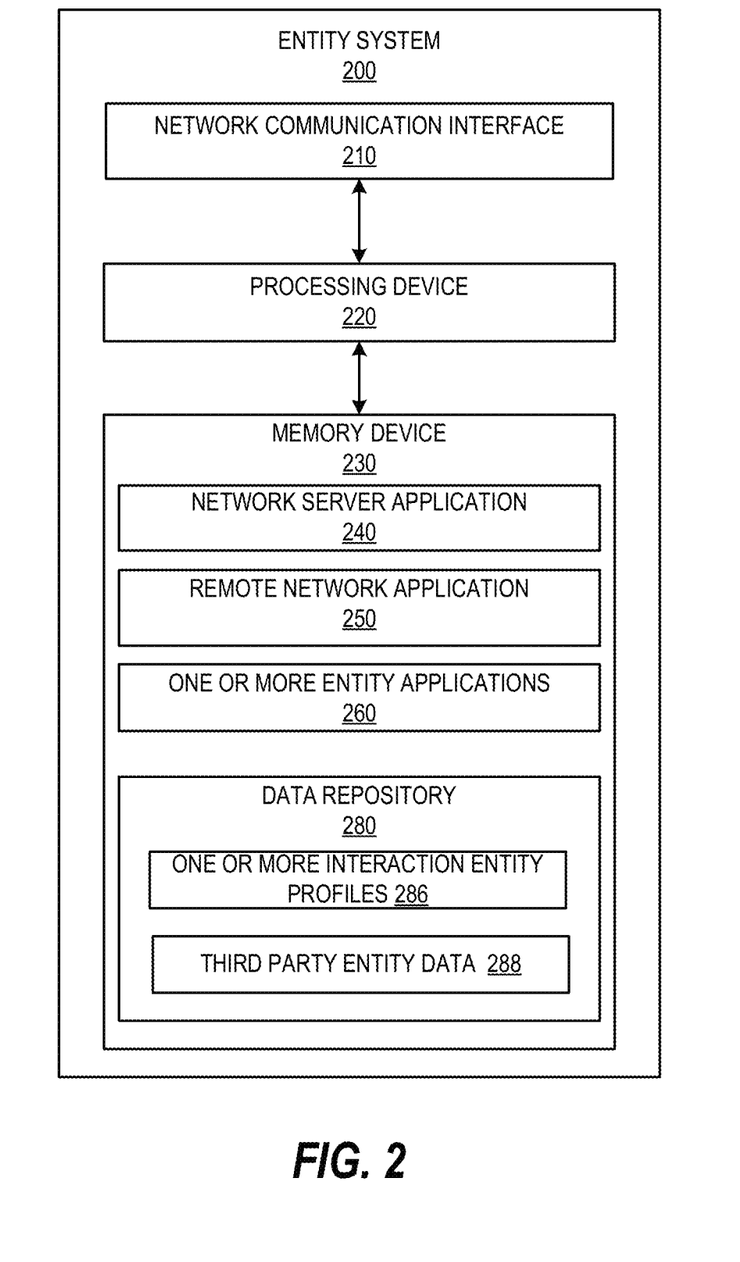
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In some embodiments, the entity system 200 may be operated by any resource entity such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a remote network application 250, one or more entity applications 260, and a data repository 280 comprising one or more interaction entity profiles 286 and third party entity data 288. The one or more interaction entity profiles 286 information associated with the one or more interaction entities, where the information may comprise delivery dates, resource amounts, interaction data, account data, or the like. The third party entity data 288 may include information associated with the vendors associated with the resource entity, where the information may include preferences associated with the vendors. The preferences may be associated displaying one or more interaction entity profiles 286. The computer-executable program code of the network server application 240, the remote network application 250, and the one or more entity applications 260 to perform certain logic, data-extraction, and data-storing functions of the entity system 200 described herein, as well as communication functions of the entity system 200.

The network server application 240, the remote network application 250 and the one or more entity applications 260 are configured to store data in the data repository 280 or to use the data stored in the data repository 280 when communicating through the network communication interface 210 with the remote network system 300, the computing device system 400, and/or the one or more third party systems 201 to perform one or more process steps described herein. In some embodiments, the entity system 200 may receive instructions from the remote network system 300 via the remote network application 250 to perform certain operations. The remote network application 250 may be provided by the remote network system 300.

Figure 3:
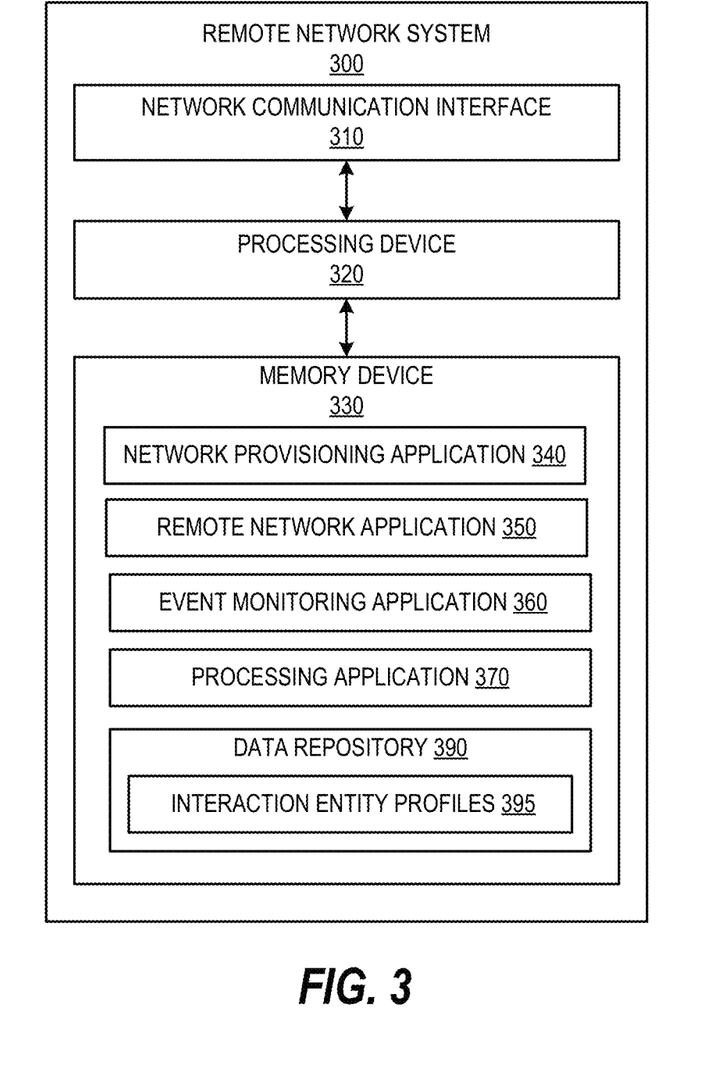
FIG. 3 provides a block diagram illustrating a distributed remote network system 300 of FIG. 1, in accordance with an embodiment of the invention.

FIG. 3 provides a block diagram illustrating the remote network system 300 in greater detail, in accordance with embodiments of the invention. As illustrated in FIG. 3, in one embodiment of the invention, the remote network system 300 includes one or more processing devices 320 operatively coupled to a network communication interface 310 and a memory device 330. In certain embodiments, the remote network system 300 is operated by a first entity, such as a financial institution, while in other embodiments, the remote network system 300 is operated by an entity other than a financial institution. In some embodiments, the remote network system 300 is owned or operated by the entity of the entity system 200. In some embodiments, the remote network system 300 may be an independent system. In alternate embodiments, the remote network system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the remote network system 300 described herein. For example, in one embodiment of the remote network system 300, the memory device 330 includes, but is not limited to, a network provisioning application 340, a remote network application 350, an event monitoring application 360, a processing application 370, and a data repository 390 comprising interaction entity profiles 395 and other data processed or accessed by one or more applications in the memory device 330. The computer-executable program code of the network provisioning application 340, the remote network application 350, the event monitoring application 360, and processing application 370 may instruct the processing device 320 to perform certain logic, data-processing, and data-storing functions of the remote network system 300 described herein, as well as communication functions of the remote network system 300.

The network provisioning application 340, the remote network application 350, the event monitoring application 360, and processing application 370 are configured to invoke or use the data in the data repository 390 when communicating through the network communication interface 310 with the entity system 200, the computing device system 400, the one or more interaction entity systems 202, and/or the one or more third party systems 201. In some embodiments, the network provisioning application 340, the remote network application 350, the event monitoring application 360, and processing application 370 may store the data extracted or received from the entity system 200, the one or more third party systems 201, the one or more interaction entity system 202, and the computing device system 400 in the data repository 390. In some embodiments, the network provisioning application 340, the remote network application 350, the event monitoring application 360, and processing application 370 may be a part of a single application. One or more processes performed by the network provisioning application 340, the remote network application 350, the event monitoring application 360, and processing application 370 are described in FIG. 6.

Figure 4:
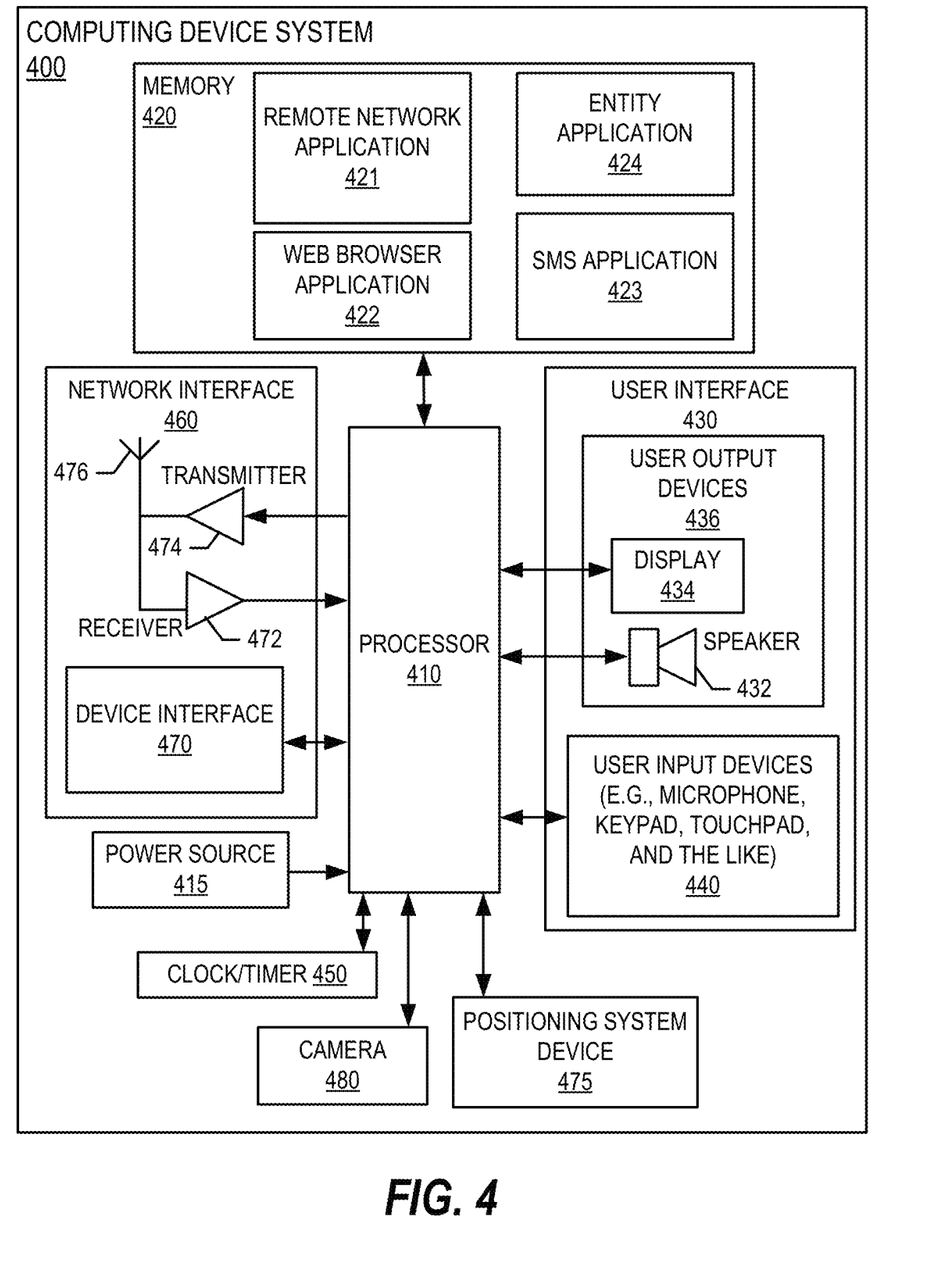
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. In some embodiments, the computing device system 400 may be party of the one or more third party entity systems and may be associated with the third party entity, where a user 110 is an employee of the third party entity that operates the computing device system to perform one or more operations associated with the interactions. It should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a remote network application 421, an entity application 424, or the like. These applications also typically instructions to a graphical user interface (GUI) on the display 430 that allows the user 110 to interact with the entity system 200, the remote network system 300, and/or other devices or systems. The memory 420 of the computing device system 400 may comprise a Short Message Service (SMS) application 423 configured to send, receive, and store data, information, communications, alerts, and the like via the wireless telephone network 152.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Typically, third party entity systems managing resource centers such as cash vaults need customer profiles to process the interactions. In existing systems, the customer profiles are typically transferred by the resource entities to the third party systems. The third party entity may modify customer profiles and in some cases the resource entity may modify the customer, thereby creating discrepancies between the two copies. This may delay the processing of the interactions. In some cases, the customers may change their preferences or acquire a new company and may notify the resource entity. There may be a delay in processing such modifications to the customer profiles and communicating the modifications to the third party entity. In such embodiments, the cash vault may receive an interaction from the new company and the cash vault may not know the sender of the interaction, thereby causing delay in processing the interaction. Moreover, existing systems do not have a contingency plan in the case where a third party entity associated with a resource center goes under. As such, there may be many problems associated with the steps performed by the existing systems to process interactions. The system of the present invention solves the problems as explained below.

Figure 5:
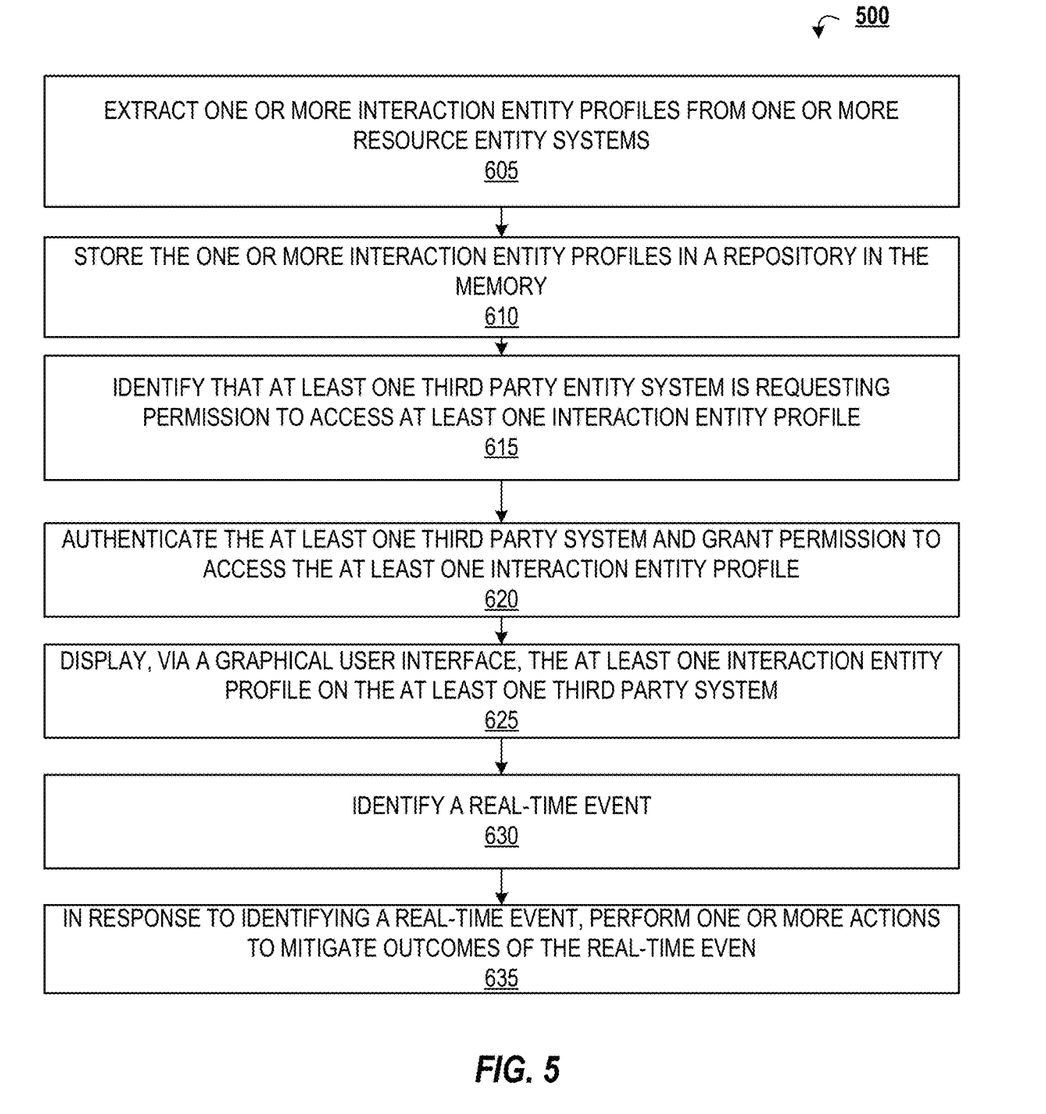
FIG. 5 provides a flowchart illustrating a process flow for processing resource center operations, in accordance with an embodiment of the invention.

FIG. 5 provides a flowchart illustrating a process flow for processing resource center operations, in accordance with an embodiment of the invention. In some embodiments, the system of the present invention may be a remote system such as a cloud based system. As shown in block 505, the system extracts one or more interaction entity profiles from one or more resource entity systems. The one or more resource entity systems may be associated with a resource entity (e.g., financial institution). The one or more interaction entity profiles may be associated with one or more interaction entities (e.g., customers of the financial institutions). The one or more interaction entity profiles may include information such as resource information, resource delivery related preferences, interaction data, historical interaction data, account data, or the like.

As shown in block 510, the system stores the one or more interaction entity profiles in a repository in the memory of the system. The system stores the one or more interaction entity profiles in the memory so that the one or more interaction entity profiles are easily accessible to the third party entity systems (e.g., vendors associated with resource centers). This eliminates the need to store multiple copies of the one or more interaction entity profiles in the resource entity systems and the systems associated with the vendors and also eliminates discrepancies between the multiple copies stored in the resource entity systems and the systems associated with the vendors.

As shown in block 515, the system identifies that at least one third party entity system is requesting permission to access at least one interaction entity profile. As shown in block 520, the system authenticates the at least one third party system and grants permission to access the at least one interaction entity profile. The at least one interaction entity profile is used by the at least one third party entity to process interactions associated with the resource entity and an interaction entity associated with the at least one interaction entity profile.

As shown in block 525, the system displays, via a graphical user interface, the at least one interaction entity profile on the at least one third party system. In some embodiments, the third party entity systems may read the profiles in a certain way or the employees of the third party entity may have preferences associated with viewing the customer profiles. The system may identify preferences of an employee or the third party entity system associated with the incoming request and modifies the graphical user interface to display the customer profiles based on the identified preferences. For example, the system may identify that the third party entity system needs the customer profiles in a table format and may instantly transform the customer data to meet the needs of the third party system before displaying the customer profiles to the third party entity system. The preferences of the third party systems and employees of the third party systems may be stored in the resource entity systems.

In some embodiments, the system identifies real-time changes associated with an interaction entity profile and updates the interaction entity profile stored in the repository. For example, an interaction entity may change its delivery or pickup schedule and may notify the resource entity and/or the remote network system. The system based on the notification updates the interaction entity profile stored in the database. In such an embodiment, if an employee of the at least one third party entity is viewing the interaction entity profile on a user computing system via a graphical user interface, the system instantly modifies the graphical user interface in real-time to reflect the real-time changes.

In some embodiments, the system may also provide an interface to the one or more third party entity systems, where the one or more third party systems may use the interface to process the interactions. For example, a third party entity systems may utilize this interface to process an incoming deposit, where an employee of the third party entity scans the deposit slip associated with a customer and the system captures the information in the deposit slip, processes the information, and finalizes the transaction by automatically updating resource information in the account of the customer. The one or more third party entity systems may utilize the interface to process all interactions. This eliminates inconsistencies associated with processing the interactions.

As shown in block 530, the system identifies a real-time event associated with the at least one third party system. In some embodiments, the system may identify the real-time event based on receiving an input from the at least one third party system. In one embodiment, the real-time event may be dissolution of at least one third party system. In another embodiment, if at least one third party system is non-operational, the system may identify the occurrence of the real-time event. As shown in block 535, the system in response to identifying a real-time event, perform one or more actions to mitigate outcomes of the real-time event. In some embodiments, the one or more actions may include transmitting alerts to the resource entity system, the one or more third party entity systems, and/or the one or more interaction entity system. In an embodiment, where the real-time event is dissolution of a third party entity, the one or more actions may include blocking the third party entity's access to the customer profiles. In an embodiment, where the real-time event is dissolution of a third party entity, the one or more actions may include transferring the permission to access the one or more interaction entity profiles to another third party entity after receiving approval from the resource entity.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A distributed remote network system for processing resource center operations, comprising:
   one or more computer processors;
   a memory; and
   a processing module stored in the memory, executable by the one or more computer processors and configured to:
   extract one or more interaction entity profiles from one or more resource entity systems, wherein the one or more interaction entity profiles are associated with one or more interaction entities, wherein the one or more resource entity systems are associated with a resource entity, wherein the one or more interaction entity profiles comprise information associated with delivery dates, pick-up dates, interaction data, account data, and resource amounts;
   store the one or more interaction entity profiles in a repository in the memory;
   identify that at least one third party entity system is requesting permission to access at least one interaction entity profile, wherein the at least one third party entity system is associated with at least one third party entity that processes interactions associated with the resource entity and the one or more interaction entities and manages resource centers to process the interactions;
   authenticate the at least one third party system and grant the permission to access the at least one interaction entity profile;
   display in real-time, via a graphical user interface, the at least one interaction entity profile on the at least one third party system, wherein the at least one interaction entity profile is an up-to-date profile, wherein the at least one interaction entity profile is used by the at least one third party entity to process interactions associated with the resource entity and an interaction entity associated with the at least one interaction entity profile;
   identify a real-time event associated with the at least one third party entity, wherein the real-time event comprises at least one of dissolution of the at least one third party entity and non-operational state of the at least one third party entity; and
   perform one or more actions to mitigate outcomes of the real-time event.

2. The distributed remote network system according to claim 1, wherein the processing module is configured to:
   identify a real-time change associated with the at least one interaction entity profile, wherein the real-time change comprises change in delivery schedule or pickup schedule;
   update the at least one interaction entity profile stored in the repository; and
   instantly modify the graphical user interface in real-time to reflect the identified real-time change on the at least one third party system.

3. The distributed remote network system according to claim 1, wherein the one or more actions comprise:
   generating and transmitting one or more alerts to at least one of the one or more resource entity systems and the one or more interaction entities;
   blocking the permission to access the one or more interaction entity profiles; and
   transferring the permission to access the one or more interaction entity profiles to at least one other third party entity.

4. The distributed remote network system according to claim 1, wherein the processing module is configured to display a processing interface to the at least one third party entity system, wherein the processing interface is utilized by the at least one third party system to perform the interactions associated with the resource entity and the one or more interaction entities in real-time.

5. The distributed remote network system according to claim 1, wherein the processing module is configured to:
identify preferences of the at least one third party and modify the graphical user interface to display the at least one interaction entity profile based on the identified preferences.

6. The distributed remote network system according to claim 1, wherein the one or more interaction entities are customers of the resource entity, wherein the at least one third party entity is a resource center.

7. A computer program product for processing resource center operations, comprising a non-transitory computer-readable storage medium having computer-executable instructions for:
extracting one or more interaction entity profiles from one or more resource entity systems, wherein the one or more interaction entity profiles are associated with one or more interaction entities, wherein the one or more resource entity systems are associated with a resource entity, wherein the one or more interaction entity profiles comprise information associated with delivery dates, pick-up dates, interaction data, account data, and resource amounts;
storing the one or more interaction entity profiles in a repository;
identifying that at least one third party entity system is requesting permission to access at least one interaction entity profile, wherein the at least one third party entity system is associated with at least one third party entity that processes interactions associated with the resource entity and the one or more interaction entities and manages resource centers to process the interactions;
authenticating the at least one third party system and grant the permission to access the at least one interaction entity profile;
displaying in real-time, via a graphical user interface, the at least one interaction entity profile on the at least one third party system, wherein the at least one interaction entity profile is an up-to-date profile, wherein the at least one interaction entity profile is used by the at least one third party entity to process interactions associated with the resource entity and an interaction entity associated with the at least one interaction entity profile;
identifying a real-time event associated with the at least one third party entity, wherein the real-time event comprises at least one of dissolution of the at least one third party entity and non-operational state of the at least one third party entity; and
performing one or more actions to mitigate outcomes of the real-time event.

8. The computer program product according to claim 7, wherein the non-transitory computer-readable storage medium comprises computer-executable instructions for:
identifying a real-time change associated with the at least one interaction entity profile, wherein the real-time change comprises change in delivery schedule or pickup schedule;
updating the at least one interaction entity profile stored in the repository; and
instantly modifying the graphical user interface in real-time to reflect the identified real-time change on the at least one third party system.

9. The computer program product according to claim 7, wherein the one or more actions comprise:
generating and transmitting one or more alerts to at least one of the one or more resource entity systems, the at least one third party entity system, and the one or more interaction entities;
blocking the permission to access the one or more interaction entity profiles; and
transferring the permission to access the one or more interaction entity profiles to at least one other third party entity.

10. The computer program product according to claim 7, wherein the non-transitory computer-readable storage medium comprises computer-executable instructions for displaying a processing interface to the at least one third party entity system, wherein the processing interface is utilized by the at least one third party system to perform the interactions associated with the resource entity and the one or more interaction entities in real- time.

11. The computer program product according to claim 7, wherein the non- transitory computer-readable storage medium comprises computer-executable instructions for identifying preferences of the at least one third party and modify the graphical user interface to display the at least one interaction entity profile based on the identified preferences.

12. The computer program product according to claim 7, wherein the one or more interaction entities are customers of the resource entity.

13. A computerized method for processing resource center operations, comprising:
extracting one or more interaction entity profiles from one or more resource entity systems, wherein the one or more interaction entity profiles are associated with one or more interaction entities, wherein the one or more resource entity systems are associated with a resource entity, wherein the one or more interaction entity profiles comprise information associated with delivery dates, pick-up dates, interaction data, account data, and resource amounts;
storing the one or more interaction entity profiles in a repository;
identifying that at least one third party entity system is requesting permission to access at least one interaction entity profile, wherein the at least one third party entity system is associated with at least one third party entity that processes interactions associated with the resource entity and the one or more interaction entities and manages resource centers to process the interactions;
authenticating the at least one third party system and grant the permission to access the at least one interaction entity profile;
displaying in real-time, via a graphical user interface, the at least one interaction entity profile on the at least one third party system, wherein the at least one interaction entity profile is an up-to-date profile, wherein the at least one interaction entity profile is used by the at least one third party entity to process interactions associated with the resource entity and an interaction entity associated with the at least one interaction entity profile,
identifying a real-time event associated with the at least one third party entity, wherein the real-time event comprises at least one of dissolution of the at least one third party entity and non-operational state of the at least one third party entity; and
performing one or more actions to mitigate outcomes of the real-time event.

14. The computerized method according to claim 13, wherein the method further comprises:

identifying a real-time change associated with the at least one interaction entity profile, wherein the real-time change comprises change in delivery schedule or pickup schedule;

updating the at least one interaction entity profile stored in the repository; and instantly modifying the graphical user interface in real-time to reflect the identified real-time change on the at least one third party system.

15. The computerized method according to claim 13, wherein the one or more actions comprise:

generating and transmitting one or more alerts to at least one of the one or more resource entity systems and the one or more interaction entities;

blocking the permission to access the one or more interaction entity profiles; and transferring the permission to access the one or more interaction entity profiles to at least one other third party entity.

16. The computerized method according to claim 13, wherein the method further comprises display a processing interface to the at least one third party entity system, wherein the processing interface is utilized by the at least one third party system to perform the interactions associated with the resource entity and the one or more interaction entities in real-time.

17. The computerized method according to claim 13, wherein the method further comprises identifying preferences of the at least one third party and modify the graphical user interface to display the at least one interaction entity profile based on the identified preferences.

* * * * *